United States Patent Office 3,014,906
Patented Dec. 26, 1961

3,014,906
6-SULFAMYL-3,7-DISUBSTITUTED-1,2,3-BENZOTRIAZINES
Shreekrishna M. Gadekar, Valley Cottage, N.Y., and Jean L. Frederick, New Milford, N.J., assignors to American Cyanamid Company, New York, N.Y., a corporation of Maine
No Drawing. Filed Apr. 26, 1960, Ser. No. 24,664
9 Claims. (Cl. 260—240)

This invention relates to new organic compounds. More particularly, it relates to 7-halo-6-sulfamyl-1,2,3-benzotriazin-4-(3H)-ones and methods of preparing the same.

In the past, 3-substituted 1,2,3-benzotriazin-(3H)-4-ones have been described [Van Heyningen, J. Am. Chem. Soc. 77, 6562 (1955)]. The prior art compounds, however, have no substituents in benzene portion of the benzotriazine nucleus and, furthermore, they do not have the physiological properties possessed by the present compounds.

The new compounds of the present invention can be illustrated by the following general formula:

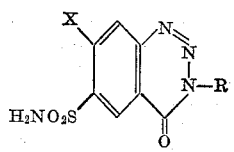

wherein X is a member of the group consisting of halogen and trifluoromethyl radicals and R is a member of the group consisting of hydrogen, lower alkyl, arloweralkyl, amino, dilower alkylaminoalkyl and α-lower alkylbenzylideneamino radicals and salts thereof.

The compounds of this invention are, in general, high melting crystalline solids, partly soluble in water, methanol and ethanol, and relatively insoluble in acetone, ethyl acetate, chloroform, benzene, toluene, ether, petroleum ether and the like. They are amphoteric substances forming both acid and base addition salts such as hydrochlorides, hydrobromides, sodio derivatives and the like.

The compounds of the present invention can be prepared by the following general reaction:

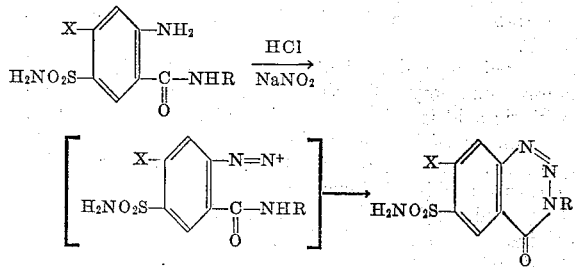

in which X and R are as defined above. The reaction is usually carried out by diazotizing a 4-halo-5-sulfamyl- or 4-trifluoromethyl-5-sulfamyl anthranilamide under slightly acidic aqueous conditions by the addition of an aqueous alkali metal nitrite solution. This addition is generally carried out at a temperature within the range of from about −5° to 15° C. over a period of time ranging from a few minutes to an hour or more. Stirring for an additional period may sometimes be desirable after the addition to allow completion of the reaction. The diazotization is effected by means of nitrous acid whether added as such or prepared in situ. Ordinarily, the insoluble product precipitates from solution and may be collected by filtration.

A variation of the method of this invention is illustrated by Example VI, below. Here the methyl ester of 4-chloro-5-sulfamylanthranilic acid is diazotized and benzylamine is then added to the reaction mixture to form the desired 3-benzyl-7-chloro-6-sulfamyl-1,2,3-benzotriazine-(3H)-4-one.

The 4-halo-5-sulfamylanthranilic acids are known compounds. The preparation of substituted 4-halo- or trifluoromethyl-5-sulfamylanthranilic acids wherein R of the general formula has different substitutents is described hereinafter in the examples.

The compounds of the present invention have activity as diuretics. For example, the compound 6-sulfamyl-1,2,3-benzotriazin-4-(3H)-one has activity greater than that of 6-chloro-7-sulfamoyl-2(H)-1,2,4-benzothiodiazine-1,1-dioxide. The latter is a well known and widely used diuretic. Diuretics are used for the relief of water in the tissues often resulting from a heart condition. They are also used for the relief of pre-menstral tension and similar periods of stress. Diuretics often aid in lowering the blood pressure to some extent where hypertension is present along with edema.

The present compounds can be administered in the form of tablets, pills, capsules or other pharmaceutical forms when compounded with suitable fillers, excipients, diluents and the like.

The following examples describe the preparation of representative compounds of the present invention. Parts are by weight unless otherwise indicated.

Example I

A mixture of 1.3 g. (0.0052 mole) of 4-chloro-5-sulfamylanthranilic acid, 10 ml. of reagent methanol and 1 ml. of concentrated sulfuric acid is heated at reflux temperature for 18 hours. The methanol is evaporated off under reduced pressure and the residue is poured into 50 ml. of ice water. The mixture is made basic with sodium bicarbonate and the white precipitate filtered off; wt. 1.30 g. (93%) of the desired ester, melting point 225–230° C. Recrystallization of a 200 mg. sample three times from ethanol affords 100 mg. of the analytical product, methyl-4-chloro-5-sulfamylanthranilate, melting point 223–227° C.

A solution of 0.20 g. (0.00076 mole) of methyl-4-chloro-5-sulfamylanthranilate in 2 ml. of methanol is treated with 10 ml. of ammonium hydroxide, stoppered and allowed to stand for 72 hours at room temperature. The solution is evaporated under reduced pressure to dryness and the residue triturated with 2 ml. of 5% sodium bicarbonate. The insoluble precipitate is filtered off and washed with cold water yielding 0.12 g. (63.2%) of the desired amide, melting point 260–268° C. (dec., eff.). A once recrystallized sample from ethanol melts at 272–274° C. (dec., eff.). The I.R. of this compound is identical with that of an authentic sample. Acidification of the bicarbonate wash with concentrated hydrochloric acid yields 50 mg. (25%) of 4-chloro-5-sulfamylanthranilic acid, melting point 255–257° C. (dec., eff.).

A stirred suspension of 2.5 g. (0.010 mole) of 4-chloro-5-sulfamylanthranilamide in 5 ml. of concentrated hydrochloric acid and 30 ml. of water is chilled to 5° C. and a solution of 1.0 g. (0.015 mole) of sodium nitrite in 20 ml. of water is added gradually over 10 minutes. The reaction mixture clears to a straw-color liquid and soon a precipitate begins to appear. At this point, the reaction mixture is made basic with 10 N sodium hydroxide and then reacidified immediately to Congo red paper with concentrated hydrochloric acid. The reaction temperature during all of these operations is maintained between 5–10° C. The precipitated solid is filtered off, washed with a minimum amount of ice water and then air dried; wt. 2.5 g.; (96%). A 0.50 g. sample of the above material recrystallized from 90 ml. of boiling water affords 0.28 g. (56%) of 7-chloro-6-sulfamyl-1,2,3-benzotriazin-4(3H)-one, a crystalline white solid melting at 270–272° C. (dec.). This compound is highly active as a diuretic and has the structural formula:

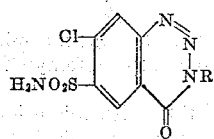

Example II

To an ice-cold solution of 10 ml. (50% by vol.) aqueous ethylamine (0.076 mole) and 1 ml. of methanol, is added 1.32 g. (0.00500 mole) of methyl-4-chloro-5-sulfamylanthranilate and the stoppered reaction flask is allowed to stand at room temperature for 90 hours. The clear solution is evaporated under reduced pressure to a white solid. This is triturated with 25 ml. of 5% sodium bicarbonate solution and the insoluble material is filtered off, washed with a minimum amount of cold water and air dried; wt. 1.0 g (73%) melting point 207–211° C. The filtrate and the washings combined on acidification with dilute hydrochloric acid gave a white solid (0.3 g.) which melts at 250–256° C. (dec.) and is identified as the 4-chloro-5-sulfamylanthranilic acid by comparing its I.R. spectrum with that of an authentic sample. An 0.2 g. sample of the crude amide N-ethyl-4-chloro-5-sulfamylanthranilamide on one recrystallization from ethanol gives 0.15 g .(75%) of a crystalline white solid melting at 215–217° C.

An ice-cold suspension (2° C.) of 2.8 g. (0.010 mole) of N-ethyl-4-chloro-5-sulfamylanthranilamide in 50 ml. of 3 N hydrochloric acid is treated rapidly with a solution of 0.7 g. (0.01 mole) of sodium nitrite in 7 ml. of water. The resultant straw-color solution on stirring for 1 hour at the ice-water temperature soon deposits a white solid which is filtered off, washed with a minimum amount of ice water and air-dried; wt. 2.0 g., melting point 180–184° C. From the filtrate an additional 0.5 g. of solid melting at 182–185° C. is obtained. Total yield, 2.5 g. (89%). An analytical sample is prepared by dissolving 2.5 g. of the above material in aqueous ethanol and clarifying the solution with activated carbon. The recovery is 1.9 g. (76%) of a glistening white solid, 7-chloro-3-ethyl-6-sulfamyl - 1,2,3 - benzotriazin-4-(3H)-one, melting at 186–187° C. This compound possesses high diuretic activity and has the following structural formula:

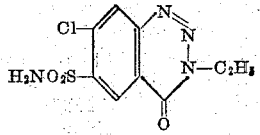

Example III

To a stirred suspension of 4.9 g. (0.020 mole) of methyl 4-chloro-5-sulfamylanthranilate in 50 ml. of 3 N hydrochloric acid is added 1.4 g. (0.022 mole) of sodium nitrite in 10 ml. of water while maintaining the temperature below 10° C. Stirring is continued for 20 minutes after addition is complete and the mixture is neutralized by the dropwise addition of 25 ml. of 5 N sodium hydroxide followed by the addition of 4.0 ml. (0.040 mole) of benzylamine; taking care that the mixture remains at 5–10 C. Stirring is continued for 1 hour and the insoluble white precipitate is filtered off giving 1.2 g. (24.6%) recovery of the starting ester, melting point 223–226° C. (clear). The water phase is exhaustively extracted with ether which, on evaporation to dryness under reduced pressure, affords 1.2 g. (17.8%) of the desired product, 3-benzyl-7-chloro-6-sulfamyl-1,2,3-benzotriazin-4-(3H)-one, melting point 185–195° C. (dec. eff.). Two recrystallizations from ethanol (activated carbon) yield an analytical sample; melting point 193–194° C. (clear).

Example IV

A solution of 2.5 g. (0.010 mole) of methyl 4-chloro-5-sulfamylanthranilate in a mixture of 10 ml. of methanol, 10 ml. of β-dimethylamino-ethylamine and 5 ml. of water is allowed to stand in a stoppered flask at room temperature for 48 hours. The solution is evaporated under reduced pressure to an amber colored syrup. The syrup is triturated with 20 ml. of 5% sodium bicarbonate and chilled to yield a tacky solid. The solid is dissolved in 10 ml. of warm ethanol and acidified with 5 ml. of alcoholic hydrochloric acid affording 1.1 g. (31.5%) of a white granular precipitate; N-(β-dimethylamino)ethyl-4-chloro-5-sulfamylanthranilamide HCl, melting point 258–260° C. (dec., eff.). Two recrystallizations from 95% aqueous ethanol containing one drop of dilute hydrochloric acid gives a 50% recovery of an analytical sample, melting point 269–272° C. (dec., eff.). Acidification of the sodium bicarbonate wash yields 0.40 g. (20%) of 4-chloro-5-sulfamylanthranilic acid, melting point 255–257° C. (dec.).

A stirred suspension of 1.0 g. (0.0028 mole) of N-(β-dimethylamino)ethyl-4-chloro - 5-sulfamylanthranilamide HCl in 10 ml. of 3 N hydrochloric acid is chilled to 0° C. and treated over a 10 minute period with a solution of 0.18 g. (0.0026 mole) of sodium nitrite in 5 ml. of water while maintaining a temperature of 5–10° C. A clear yellow solution forms almost immediately. Stirring is continued for 1 hour, and the white precipitate which has formed in the reaction mixture is filtered off. The reaction affords 0.60 g. (60%) of product; melting point 280–283° C. (dec., eff.). Two recrystallizations of a 100 mg. sample from 95% aqueous ethanol containing a drop of alcoholic hydrochloric acid gives 65 mg. of product, 7 - chloro - 3 - (β - dimethylamino)ethyl-6-sulfamyl-1,2,3-benzotriazin-4-(3H)-one HCl, melting point 286–287° C. (dec., eff.).

Example V

A solution of 5.0 g. (0.018 mole) of methyl 4-chloro-5-sulfamylanthranilate, 50 ml. of methanol and 200 ml. of 25% aqueous methylamine is allowed to stand at room temperature in a stoppered flask for 64 hours. Evaporation to dryness under reduced pressure of the solution, followed by trituration with 100 ml. of 5% sodium bicarbonate gives an off-white solid. Yield: 4.4 g., (93.7%) melting point 276–280° C. Two recrystallizations of a 100 mg. sample from ethanol (approximately 100 ml.) afford 60 mg. of a shiny white crystalline solid; N-methyl 4-chloro-5-sulfamylanthranilamide, melting point 274–276° C.

A stirred suspension of 3.6 g. (0.014 mole) of N-methyl 4-chloro-5-sulfamylanthranilamide in 50 ml. of 3 N hydrochloric acid is chilled to 0° C. and treated with 1.0 g. (0.015 mole) of sodium nitrite in 25 ml. of water maintaining a temperature below 10° C. A clear yellow solution forms rapidly followed by precipitation of a light yellow solid. After stirring at 10° C. for 2 hours the precipitate is filtered off. The solid is triturated with 500 ml. of hot ethanol and, as the compound is fairly insoluble in ethanol, the remaining solid is filtered off and air dried. The off-white solid weighs 2.0 g., melting point 246–248° C. (dec., eff.). The ethanol solution is treated with activated carbon and chilled to give an analytical sample of product; 7-chloro-3-methyl-6-sulfamyl-1,2,3-benzotriazin-4-(3H)-one, wt. 0.26 g. melting point 247–250° C. (dec., eff.). Evaporation of the ethanol filtrate to 100 ml. gives another 0.55 g. of white solid, melting point 246–249° C. (dec., eff.). Total yield of the desired product is 2.8 g. (75%).

Example VI

A solution of 0.50 g. (0.0020 mole) of methyl 4-chloro-5-sulfamylanthranilate in 10 ml. of hydrazine hydrate is allowed to stand at room temperature for 90 hours. After evaporating to dryness under reduced pressure, the residue is triturated with 15 ml. of 5% sodium bicarbonate and the solid is filtered off and washed thoroughly with water. Recrystallization from large quantities of ethanol affords 0.21 g. (41%) of the desired hydrazide, 4-chloro-5-sulfamylanthranilhydrazide, melting point 238–241° C. (dec., eff.).

A mixture of 1.8 g. (0.0068 mole) of 4-chloro-5-sulfamylanthranilhydrazide, 0.79 ml. (0.0068 mole) of acetophenone and 0.15 ml. of glacial acetic acid in 150 ml. of ethanol is refluxed for 1 hour. Since all of the hydrazide fails to go into solution, an additional 100 ml. of ethanol is added and refluxing is continued for 3 hours. The resulting light yellow solution is allowed to stand at room temperature over the weekend. The pale yellow solid which precipitated is filtered off. Evaporation of the filtrate to 50 ml. under reduced pressure gives a second crop of crystals which, when combined with the first, gives 2.2 g. (86%) of the desired hydrazone, melting point 257–260° C. (dec., eff.). Recrystallization of a 100 mg. sample of this from ethanol yields 65 mg. of product, $N^1$-4-chloro-5-sulfamylanthranoyl-$N^2$-($\alpha$-methylbenzylidene) hydrazine, melting point 258–261° C. (dec. eff.).

A mixture of 2.0 g. (0.0054 mole) of $N^1$-4-chloro-5-sulfamylanthranoyl-$N^2$-($\alpha$-methylbenzylidene) hydrazine in 10 ml. of glacial acetic acid and 3 ml. of water is chilled to 0° and treated with 0.46 g. (0.0066 mole) of sodium nitrite in 3 ml. of water while maintaining a temperature of 0–5° C. The mixture is stirred at 5° C. for 1 hour, but since a clear solution is not obtained, it is allowed to warm to room temperature and stirred for an additional 2½ hours. The mixture is filtered to remove the solid precipitate which is then heated with 50 ml. of ethanol and the solid which fails to go into solution is filtered off. This ethanol insoluble fraction is identified as the starting material, 1.5 g. (75%), melting point 250–253° C. (dec., eff.). The ethanol solution on chilling gives 0.14 g. (7%) of the product, 7-chloro-3-($\alpha$-methylbenzylidene) amino-6-sulfamyl - 1,2,3 - benzotriazin-4-(3H)-one, melting point 228–230° C. (dec., eff.). Two recrystallizations of a 100 mg. sample from ethanol gives 40 mg. of shiny yellow plates, melting point 237–240° C. (dec., eff.).

*Example VII*

A suspension of 0.30 g. (0.0078 mole) of 7-chloro-3-($\alpha$-methylbenzylidine) amino-6-sulfamyl-1,2,3-benzotriazine-4-(3H)-one in 10 ml. of 3 N hydrochloric acid is heated on the steam bath with stirring for 15 minutes. The solid is filtered from the hot solution. A strong odor of acetophenone is observed; therefore, the precipitate is washed with 10 ml. of ether to remove any traces of acetophenone present. Yield of 3-amino-7-chloro-6-sulfamyl-1,2,3-benzotriazine-4-(3H)-one, 0.16 g.; melting point 222–222.5° C. (eff.). Two recrystallizations of a 100 mg. sample from ethanol affords a 60% recovery of a sample, melting point 230–231° C. (dec. eff.).

*Example VIII*

The reaction of 10 parts of N-acetyl-5-carboxy toluidine with an excess of sulfur tetrafluoride at 120–150° C. in a sealed tube according to the method of Smith et al., J. Amer. Chem. Soc. 81, 3165 (1959) gives N-acetyl-5-trifluoromethyltoluidine as the principal product.

Chlorosulfonation followed by amination with ammonia of 10 parts of N-acetyl-5-trifluoromethyltoluidine (prepared above) with chlorosulfonic acid at 80–100° C. according to the method of Cohen et al., J. Amer. Chem. Soc. 81, 5508 (1959) gives N-acetyl-4-sulfamyl-5-trifluoromethyltoluidine.

Oxidation of 10 parts of N-acetyl-4-sulfanyl-5-trifluoromethyl toluidine (prepared above) with potassium permanganate by the method of Cohen et al, J. Amer. Chem. Soc. 81, 5508 (1959) gives 5-sulfamyl-4-trifluoromethyl-N-acetylanthranilic acid.

A mixture of 5 parts of 5-sulfamyl-4-trifluoromethyl-N-acetyl anthranilic acid, 10 ml. of methanol and 1 ml. of concentrated sulfuric acid, on refluxing for 20 hours gives methyl 5-sulfamyl-4-trifluoromethyl anthranilate. A solution of 2 parts of methyl-5-sulfamyl-4-trifluoromethyl anthranilate, 20 parts of methanol and 100 parts of concentrated ammonia stoppered and allowed to stand for 72 hours at room temperature gives 5-sulfamyl-4-trifluoromethylanthranilamide as described in the procedure of Example I.

A stirred suspension of 25 parts of 5-sulfamyl-4-trifluoromethylanthranilamide in 50 parts of concentrated hydrochloric acid and 300 parts of water is reacted with 15 parts of sodium nitrite in 25 parts of water at 5° C. over a 10 minute period. After the addition of the nitrite solution, the reaction mixture is made alkaline with sodium hydroxide and then immediately reacidified with concentrated hydrochloric acid to Congo red paper. The precipitate that forms is collected, washed with cold water and air dried. The product is 6-sulfamyl-7-trifluoromethyl-1,2,3-benzotriazin-4(3H)-one.

We claim:

1. A compound selected from the group consisting of those of the formula:

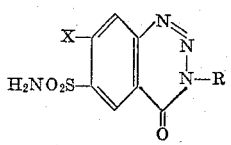

wherein X is a member of the group consisting of halogen and trifluoromethyl radicals and R is a member of the group consisting of hydrogen, lower alkyl, benzyl, amino, dilower alkylaminoalkyl and α-lower alkylbenzylideneamino radicals and therapeutically acceptable salts thereof.

2. The compound 7-chloro-6-sulfamyl-1,2,3-benzotriazin-4-(3H)-one.

3. The compound 7-chloro-3-ethyl-6-sulfamyl-1,2,3-benzothiazin-4(3H)-one.

4. The compound 3-benzyl-7-chloro-6-sulfamyl-1,2,3-benzotriazin-4-(3H)-one.

5. The compound 7-chloro-3-(β-dimethylamino) ethyl-6-sulfamyl-1,2,3-benzotriazin-4-(3H)-one HCl.

6. The compound 7-chloro-3-methyl-6-sulfamyl-1,2,3-benzotriazin-4-(3H)-one.

7. The compound 7-chloro-3-(α-methylbenzylidene) amino-6-sulfamyl-1,2,3-benzotriazin-4-(3H)-one.

8. The compound 3-amino-7-chloro-6-sulfamyl-1,2,3-benzotriazin-4-(3H)-one.

9. A compound of the formula:

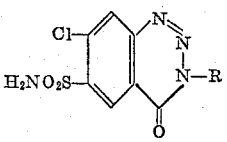

wherein R is lower alkyl.

References Cited in the file of this patent

UNITED STATES PATENTS

| | | |
|---|---|---|
| 2,809,194 | Novello | Oct. 8, 1957 |
| 2,910,488 | Novello | Oct. 27, 1959 |
| 2,952,680 | Novello | Sept. 13, 1960 |

OTHER REFERENCES

Chem. Abstracts, vol. 19, cols. 645–6 (1925).

Van Heyningen: Journ. of the Am. Chem. Soc., vol. 77, pp. 6562–4 (1955).

Erickson et al.: The 1, 2, 3, and 1, 2, 4-Triazines, Tetrazines and Pentazines, pages 13 to 26, Interscience Publishers, Inc., N.Y. (1956).

UNITED STATES PATENT OFFICE
CERTIFICATE OF CORRECTION

Patent No. 3,014,906 December 26, 1961

Shreekrishna M. Gadekar et al.

It is hereby certified that error appears in the above numbered patent requiring correction and that the said Letters Patent should read as corrected below.

Column 3, lines 3 to 9, the formula should appear as shown below instead of as in the patent:

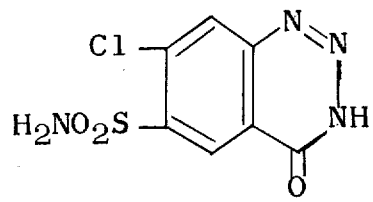

column 6, line 39, for "benzothiazin" read -- benzotriazin --.

Signed and sealed this 24th day of April 1962.

(SEAL)
Attest:

ESTON G. JOHNSON
Attesting Officer

DAVID L. LADD
Commissioner of Patents